Aug. 15, 1961 G. S. KINSEY 2,996,605
BAIT-UP-LITE
Filed April 15, 1959
FIG. 1
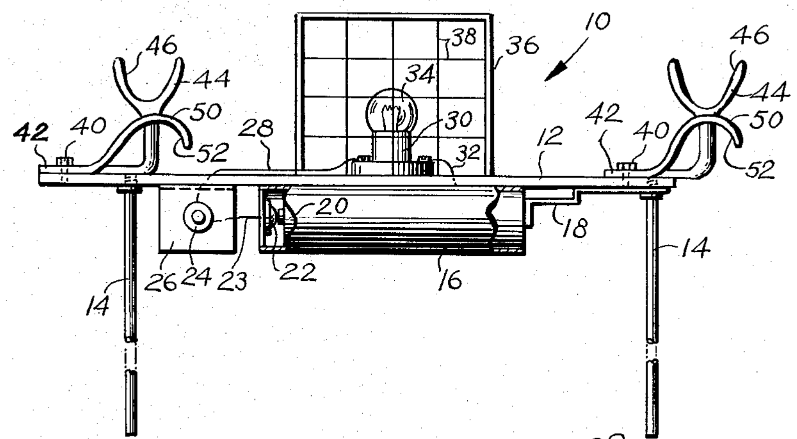
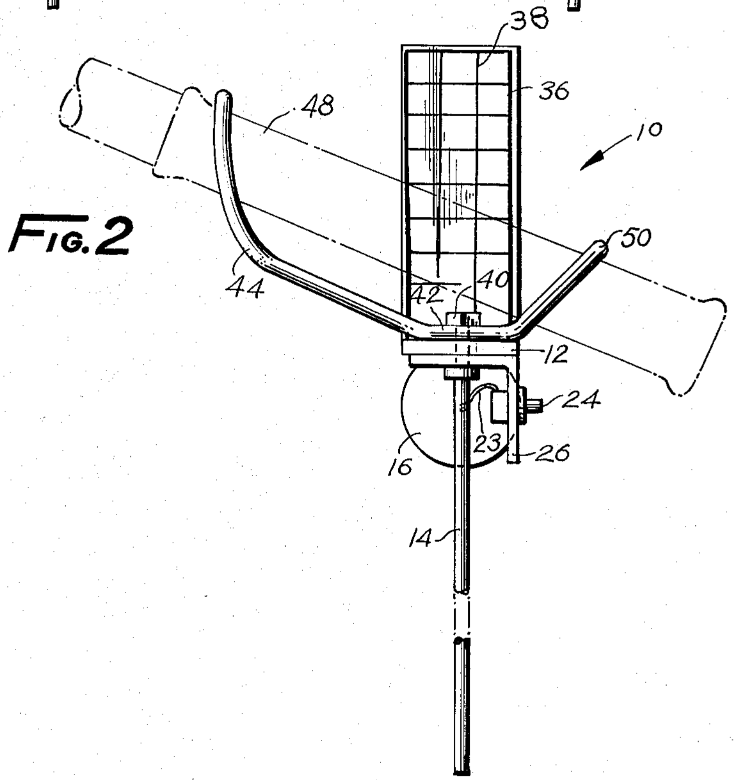
FIG. 2
INVENTOR.
GEORGE S. KINSEY United States Patent Office
2,996,605
Patented Aug. 15, 1961

1

2,996,605

BAIT-UP-LITE

George S. Kinsey, 58 W. 5th St., Pottstown, Pa.
Filed Apr. 15, 1959, Ser. No. 806,508
1 Claim. (Cl. 240—6.4)

This invention relates to fishing equipment and more particularly to an accessory therefor.

It is an object of the present invention to provide an illuminated fishing rod holder that will enable fishermen to conveniently work two separate fishing poles at the same time.

Another object of the present invention is to provide an illuminated fishing rod holder of the above type having self contained illuminating means for providing sufficient light for handling such fishing poles in the dark, and which unit can be conveniently collapsed for convenient storage and transporting purposes.

Other objects of the invention are to provide an illuminated fishing rod holder bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a rear elevational view, partly in section, of an illuminated fishing rod holder made in accordance with the present invention; and FIGURE 2 is an enlarged side elevational view of the device shown in FIGURE 1, illustrating the manner in which the fishing pole is removably attached thereto.

Referring now more in detail to the drawing, an illuminated fishing rod holder 10 made in accordance with the present invention is shown to include a substantially flat elongated base plate 12 having a rod type leg 14 threadedly secured to each end thereof for supporting the base plate 12 in spaced relationship with the ground, into which the lower ends of the rods 14 may be thrust.

A cylindrical battery case 16 is secured, such as by a bracket 18, to the lower central portion of the base plate 12, such case 16 conveniently supporting a plurality of dry cells 20 therewithin, in electrical circuit relationship with a positive terminal 22. An insulated wire 23 connects this terminal 22 to a manually operated toggle or push button switch 24 mounted upon a depending plate 26. This switch is, in turn, connected in series by means of a lead 28 to the base 30 of a lamp socket, the opposite side of which is connected by means of a lead 32 to the negative end of the battery case 16. A lamp 34, of suitable size, is removably supported within the socket 30, so as to provide sufficient illumination in the dark. The safety housing 36 having a wire mesh opening 38, envelops the lamp 34 to prevent damage thereto and to direct the light toward the sides of the base plate.

A pair of bolts 40 secure a pair of fishing rod brackets one to each end of the base plate 12. Each such bracket

2 includes a central mounting portion 42, a yoke 44 having an upwardly opening recess 46, and a concave arcuate portion 50 defining a downwardly opening socket 52. The yoke 44 and arcuate member 50 are mounted in opposite ends of the mounting portion 42 of each bracket, the yoke 44 extending upwardly to a higher level than the arcuate portion 50. It will thus be recognized that when the fishing pole 48 is placed upon the yoke 44, the terminal end thereof may be placed with the arcuate portion 50 and into the socket 52, thus securing the fishing pole in the position shown in broken lines in FIGURE 2. Each bracket is intended to removably support a separate fishing pole in this manner, so that both hands are free to tend either one of the poles, while the lamp 34 provides sufficient light for this purpose.

When not in use, the rodlike legs 14 are readily removed from the base plate 12, and the unit can be conveniently stored in a relatively small space or placed within a tackle box, for convenient handling and transportation from one place to another.

While various changes may be made in the detail construction, it shall be understood that such changes shall be within the spirit and scope of the present invention as defined by the appended claim.

What I claim as new and desire to protect by Letters Patent of the United States is:

An illuminating fishing rod holder comprising, in combination, a base plate, pedestal means for supporting said base plate above a ground level, illuminating means mounted upon said base plate intermediate the opposite ends thereof, means for energizing said illuminating means, and bracket means at each end of said base plate on opposite sides of said illuminating means, said pedestal means comprising a pair of elongated rods, one of said rods being threadably and removably mounted at each end of said base plate, said illuminating means comprising a housing secured to the central portion of said base plate, a lamp supported within said housing, an electric circuit means connecting said lamp to said energizing means, said energizing means comprising a battery case secured to said base plate intermediate of said rods, a switch carried upon said base plate intermediate said battery case and one of said rods, and conductors electrically connecting said battery case switch and lamp in series, said switch controlling energization of said lamp by said battery case; said bracket means each comprising a bracket having a central mounting portion secured upon one end of said base plate, an upwardly opening yoke at one end of each bracket means, a downwardly opening socket at the opposite ende of each bracket means, and said yoke being supported at a higher level above said base plate and said socket.

References Cited in the file of this patent

UNITED STATES PATENTS

| | | |
|---|---|---|
| 1,149,933 | Martzolf | Aug. 10, 1915 |
| 2,538,788 | Massino | Jan. 23, 1951 |